(12) United States Patent
Murase et al.

(10) Patent No.: US 6,298,042 B1
(45) Date of Patent: Oct. 2, 2001

(54) PACKET SWITCHING APPARATUS ADAPTED TO CONTROL ALLOWED TRANSMISSION RATE IN PACKET SWITCHING NETWORK, AND METHOD OF CONTROLLING ALLOWED TRANSMISSION RATE

(75) Inventors: Tutomu Murase; Takashi Iwasaki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/109,096

(22) Filed: Jul. 2, 1998

(30) Foreign Application Priority Data

Jul. 2, 1997 (JP) .................................... 9-176250

(51) Int. Cl.$^7$ ................................. H04L 12/56
(52) U.S. Cl. ..................... 370/235; 370/230; 370/252; 709/233
(58) Field of Search .................. 370/229, 231, 370/230, 232, 234, 412, 468, 351, 233, 249, 235, 236, 252, 238

(56) References Cited

U.S. PATENT DOCUMENTS

| | | | |
|---|---|---|---|
| 5,675,576 | * 10/1997 | Kalampoukas et al. | 370/232 |
| 5,748,901 | * 5/1998 | Afek et al. | 709/238 |
| 5,774,455 | 6/1998 | Kawase et al. | 370/232 |
| 5,805,599 | * 9/1998 | Mishra et al. | 370/468 |
| 5,905,711 | * 5/1999 | Chiussi et al. | 370/232 |
| 5,909,443 | * 6/1999 | Fichou et al. | 370/412 |
| 5,987,031 | * 11/1999 | Miller et al. | 370/412 |
| 6,038,217 | * 3/2000 | Lyles | 370/233 |
| 6,094,418 | * 7/2000 | Soumiya et al. | 370/231 |

FOREIGN PATENT DOCUMENTS

| | | |
|---|---|---|
| 0 548 995 | 6/1993 | (EP) . |
| 0 573 739 | 12/1993 | (EP) . |
| 8-204721 | 8/1996 | (JP) . |
| 9-8814 | 1/1997 | (JP) . |
| 9-83539 | 3/1997 | (JP) . |
| 9-162865 | 6/1997 | (JP) . |
| 10-173661 | 6/1998 | (JP) . |

OTHER PUBLICATIONS

Kung et al., "Credit–Based Flow Control For ATM Networks: Credit Update Protocol, Adaptive Credit Allocation, and Statistical Multiplexing"; Computer Communications Review; vol. 24, No. 4; Oct. 1, 1994; pp. 101–114; XP–000477044.

H. Shimizu et al., "ATM–LAN", Software Research Center, pp. 122–126, Jul. 5, 1995.

S.S. Sathaye et al., ATM forum traffic management specification version 4.0 R11, Mar. 1996, pp. 39–40.

* cited by examiner

Primary Examiner—Hassan Kizou
Assistant Examiner—John Pezzlo
(74) Attorney, Agent, or Firm—Foley & Lardner

(57) ABSTRACT

A packet switching apparatus is disclosed which is adapted to determine and control an allowed transmission rate of a transmitting terminal in a packet switching network. The packet switching apparatus comprises a rate discriminator to monitor an interval of packet reception for each of connections, judge, based on the interval of packet reception, whether the transmitting terminal having sent the packet is in pause of transmission and determine a first allowed transmission rate for the transmitting terminal correspondingly to a result of the judgment, an ER calculator to calculate, based on a predetermined algorithm, a second allowed transmission rate for the transmitting terminal, and an ER setter to select one of the first allowed transmission rate determined by the rate discriminator and second allowed transmission rate calculated by the ER calculator, whichever is smaller, and write it into a packet returned to the transmitting terminal.

15 Claims, 6 Drawing Sheets

US 6,298,042 B1

PACKET SWITCHING APPARATUS ADAPTED TO CONTROL ALLOWED TRANSMISSION RATE IN PACKET SWITCHING NETWORK, AND METHOD OF CONTROLLING ALLOWED TRANSMISSION RATE

BACKGROUND OF THE INVENTION

1. Field of the Invention

The present invention relates to a packet switching apparatus adapted to determine and control an allowed transmission rate to be informed to a transmitting terminal in a packet switching network in which a band management is done by feedback control, and a method of controlling the allowed transmission rate.

2. Description of the Related Art

As one of the communication systems in which feedback control is done, an available bit rate (ABR) service in an asynchronous transfer mode (ATM) network has been proposed. The ABR service is disclosed in the document "ATM forum Traffic Management Specification Version 4.0 R11" (Shirish S. Sathaye, March 1996). In the ABR service, an allowed cell rate (ACR) being a transmission cell rate at a terminal is controlled by a feedback control in which a resource management (RM) cell is used.

FIG. 4 is a schematic block diagram showing the configuration of an ATM network for an ABR service. The operation of the ABR service as in the document "ATM forum Traffic Management Specification Version 4.0 R11" will be described herebelow with reference to FIG. 4.

In FIG. 4, an ATM network is generally indicated with a reference 401. The ATM network 401 incorporates an ATM switch 402 and has connected thereto a transmitting terminal 403 and receiving terminal 404. For sending data to the receiving terminal 404, the transmitting terminal 403 mixes a forward resource management (FRM) cell in a data cell. Upon reception of the data cell through the ATM switch 404, the receiving terminal 404 will change the FRM cell to a backward resource management (BRM) cell and send it back to the transmitting terminal 403.

When the FRM cell sent from the transmitting terminal 403 and the BRM cell sent back from the receiving terminal 404 are passed through the ATM switch 402, the ATM cell 402 will write into either the FRM or BRM cell or into both an explicit rate (ER) indicative of how much congested the connections from the transmitting terminal 403 to the receiving terminal 404 are currently. The ER is a maximum transmission rate at which such connections routed through the ATM switch 402 are allowable without any congestion and which is currently allowed for the transmitting terminal 403. When the connections through the ATM switch 402 are totally a low load, a higher ACR is allowable for the transmitting terminal 403. Therefore, the ER value calculated by the ATM switch 402 will be a large one. On the contrary, when such connections are a larger load, the ATM switch 402 will calculate a smaller ER value. The transmitting terminal 403 will increase or decrease the ACR based on an ER written in the BRM cell sent from the ATM switch 402 to effect a data communications at a rate within the range of increased or decreased ACR.

As mentioned above, the transmitting terminal 403 decreases the ACR because of a received ER value which is lower. In addition, the ACR is decreased due to an initialization thereof. More particularly, if a length of time for which the transmitting terminal 403 sends no FRM cell exceeds an ACR decrease time factor (ADTF), the ACR will be decreased to an initial cell rate (ICR). As described in the aforementioned document "ATM forum Traffic Management Specification Version 4.0 R11", this initialization is an operation effected by the transmitting terminal 403 controlling itself. One of the FRM cell sending conditions is that one FRM cell is sent for a predetermined number of data cells. Thus, since an extremely small number of FRM cells is sent when the transmitting terminal 403 has no further data to send, the ACR initialization will be effected. The purpose of this ACR initialization is for the transmitting terminal 403 to resume with an ICR, not any ACR, a data transmission of which it has once been in pause, in a predetermined time from the pause, thereby preventing the network from being abruptly applied with a large load.

FIG. 5 is a schematic block diagram of an ATM switch in the ATM network, showing the role of the ATM switch. In the network illustrated in FIG. 5, transmitting terminals 502 equal in peak cell rate (PCR) to each other are connected to an ATM switch 504 to links 503, respectively, each having a linkage capacity which is same as the PCR of the transmitting terminals 501 and 502, they are multiplexed by an ATM switch 504, and connected to an ATM network 505 via another link 503. Of the transmitting terminals, one 501 will always send data at a full ACR as the actual transmission rate while the other 502 will send data initially at the full ACR, then at a rate extremely low (LCR) but at which the ACR is not initialized by the transmitting terminal itself, and at the full ACR again in a predetermined time after that.

FIG. 6 is a time chart showing the operations of the transmitting terminal 502 shown in FIG. 5. FIG. 6 shows values of an ER received by the transmitting terminal 502, and an ACR and an actual transmission rate, respectively, of the terminal 502. First, when the transmitting terminals 501 and 502 are continuously sending data, the ER for no congestion of the ATM switch 504 will take a half of a PCR value (will be referred to simply as "PCR" hereinafter), that is, "PCR/2". Accordingly, the ACR of the transmitting terminals 501 and 502 having received that ER will also be "PCR/2". The transmitting terminals 501 and 502 will send data at an actual transmission rate "PCR/2".

In this condition, the actual transmission rate of the transmitting terminal 502 will be reduced to "LCR" at a time t0. The "LCR" is a very small value at which however the ACR will not be initialized. As the actual transmission rate is thus decreased, the ATM switch 504 will be applied with little load for the data transmission by the transmitting terminal 502. Therefore, the ATM 504 will calculate a new ER. Conventionally, the ER will be equal to "PCR" when calculated by the commonly used ER calculation method stated in "Explicit Rate Indication for Congestion Avoidance; ERICA)" in the aforementioned document "ATM forum Traffic Management Specification Version 4.0 R11". The ATM switch 504 will inform the new ER thus calculated thereby to the transmitting terminals 501 and 502.

It should be noted for FIG. 6 that the ER value of "PCR" is informed to the transmitting terminal 502 at a time t2 a predetermined time after the time t0 at which the actual transmission rate of the transmitting terminal 502 has decreased to "LCR". This is because for a time period from the reduction of the actual transmission rate of the transmitting terminal 502 until the terminal 502 is informed of an ER reflecting the reduced actual transmission rate, a propagation delay is caused by a distance between the transmitting terminal 502 and ATM switch 504.

The transmitting terminal 501 has an actual transmission rate equal to "PCR" since the received new ER will lead to an ACR which takes a value "PCR". On the other hand, the actual transmission rate of the transmitting terminal 502 is very low being "LCR", but the ACR will be maintained at "PCR" because the received ER has a value of "PCR".

Next, assume that a factor having reduced to "LCR" the actual transmission rate of the transmitting terminal 502 has been eliminated at a time t5 as shown in FIG. 6. Thus, the actual transmission rate of the transmitting terminal 502 will be raised up to the full ACR. The ACR is not be initialized but maintained at "PCR", so that the actual transmission rate will abruptly jump up to an ACR value, that is, "PCR". Therefore, both the transmitting terminals 501 and 502 will send data at the actual transmission rate "PCR" after the time t5 and so the amount of data arriving at the ATM switch 504 and ATM network 505 will exceed the capacity (equal to "PCR") of the link 503 connecting the ATM switch 504 and ATM network 505 to each other. Thus, a serious congestion will take place at the ATM switch 504. Then, the ATM switch 504 will reduce the ER value to "PCR/2" and inform it to the transmitting terminals 501 and 502.

Because of the delay of a propagation between the transmitting terminals 501 and 502 and the ATM switch 504 as mentioned above, however, the transmitting terminals 501 and 502 will receive the ER of "PCR/2" and starts decreasing the ACR at a time t7 which is a predetermined time from the time t5 at which the congestion has first taken place. For a time period from the time t5 until t7, an extremely high possibility of cell loss will exist in the ATM switch 504.

As having been described in the foregoing, the conventional ATM network is disadvantageous in that if the actual transmission rate of a certain one of the transmitting terminals connected to the ATM network falls, the ACR has an higher ACR reflecting the reduced actual transmission rate, and if the transmitting terminal in question abruptly raises the actual transmission rate up to the full ACR, the ATM network will suddenly be applied with a large load so that a cell loss will take place with a result that the ATM network will incur a lower efficiency of data transmission.

SUMMARY OF THE PRESENT INVENTION

The present invention has an object to overcome the above-mentioned drawbacks of the prior art by providing a packet switching apparatus destined for use in a packet transmission network and adapted to prevent the network from being suddenly applied with a high load without any rapid change of the actual transmission rate to a high value and avoid any cell loss even if the actual transmission rate of a certain one of transmitting terminals involved in an ABR service becomes lower and that transmitting terminal has a suddenly increased amount of data to send after the ACR of the transmitting terminal is initialized, and a method of controlling the transmission rate.

The present invention has another object to provide a packet switching apparatus adapted to improve the safety of a network in which it is incorporated, by initializing the ACR of a transmitting terminal under control of the network, and a method of controlling the transmission rate.

The present invention has a still another object to provide a packet switching apparatus adapted to judge the pause of transmission for each virtual path or virtual channel with no influence on the ACR of other virtual paths or virtual channels, and a method of controlling the transmission rate.

The present invention have a yet another object to provide a packet switching apparatus in which a time of protection is set to judge whether a transmitting terminal is in pause of transmission to prevent the throughput from being reduced due to a frequent initialization of ACR, and a method of controlling the transmission rate.

According to the first aspect of the invention, a packet switching apparatus adapted to determine and control an allowed transmission rate for a transmitting terminal connected in a packet switching network in which a band is controlled by a feedback control, comprises means for monitoring the interval of packet reception for each connection, and judging, based on the interval of packet reception, whether the transmitting terminal having sent the packet is in pause of transmission and determining a first allowed transmission rate for the transmitting terminal correspondingly to a result of the judgment, means for calculated a second allowed transmission rate based on a predetermined algorithm, and means for selecting a smaller one among the first allowed transmission rate determined by the rate discriminating means and the second allowed transmission rate calculated by the rate calculating means, and writing it into a packet returned to the transmitting terminal.

In the preferred construction, the apparatus further comprises means for storing a threshold arbitrarily set for the interval of packet reception, the rate discriminating means judging, when the interval of packet reception is smaller than the threshold, the transmitting terminal having sent the packet to be in pause of transmission.

In the preferred construction, the apparatus further comprises means for storing the arbitrarily set threshold for the interval of packet reception and an arbitrarily set protection time, the rate discriminating means judging, when the status in which the interval of packet reception is smaller than the threshold lasts for a time equivalent to the protection time, the transmitting terminal having sent the packet to be in pause of transmission.

In another preferred construction, when the rate discriminating means judges the transmitting terminal to be in pause of transmission, a preset value is taken for the first allowed transmission rate, when the transmitting terminal is not in pause of transmission, a maximum value allowed for a transmission in the network is taken for the first allowed transmission rate.

In another preferred construction, when the rate discriminating means judges the transmitting terminal to be in pause of transmission, a preset value which is approximately an initial transmission rate of the transmitting terminal is taken for the first allowed transmission rate, when the transmitting terminal is not in pause of transmission, a maximum value allowed for a transmission in the network is taken for the first allowed transmission rate.

According to the second aspect of the invention, a packet switching apparatus adapted to determine and control an allowed transmission rate for a transmitting terminal connected in an ATM network being a packet switching network in which a band is controlled by a feedback control, and in which an ABR service is done in which a band control by a resource management cell is effected, comprises means for monitoring the interval of cell reception for each virtual path or channel of a reception cell, and judging, based on the interval of cell reception, whether the transmitting terminal having sent the cell is in pause of transmission and determining a first ER value for the transmitting terminal correspondingly to a result of the judgment, means for calculated a second ER value based on a predetermined algorithm, and means for selecting a smaller one among the first ER value determined by the rate discriminating means and the second ER value calculated by the rate calculating means, and writing it into a backward resource management cell returned to the transmitting terminal.

In the preferred construction, the apparatus further comprises means for storing a threshold arbitrarily set for the interval of cell reception, the rate discriminating means judging, when the interval of cell reception is smaller than the threshold, the transmitting terminal having sent the cell to be in pause of transmission.

In the preferred construction, the apparatus further comprises means for storing the arbitrarily set threshold for the interval of cell reception and an arbitrarily set protection time, the rate discriminating means judging, when the status in which the interval of cell reception is smaller than the threshold lasts for a time equivalent to the protection time, the transmitting terminal having sent the cell to be in pause of transmission.

In another preferred construction, when the rate discriminating means judges the transmitting terminal to be in pause of transmission, a preset value is taken for the first ER value, when the transmitting terminal is not in pause of transmission, a peak cell rate allowed for a transmission in the network is taken for the first ER value.

In another preferred construction, when the rate discriminating means judges the transmitting terminal to be in pause of transmission, a preset value which is approximately an initial cell rate of the transmitting terminal is taken for the first ER value, when the transmitting terminal is not in pause of transmission, a peak cell rate allowed for a transmission in the network is taken for the first ER value.

According to another aspect of the invention, a method of determining and controlling an allowed transmission rate for a transmitting terminal connected in a packet switching network in which a band is controlled by a feedback control, comprising the steps of monitoring the interval of packet reception for each connection, judging, based on the interval of packet reception, whether the transmitting terminal having sent the packet is in pause of transmission and determining a first allowed transmission rate for the transmitting terminal correspondingly to a result of the judgment, calculating a second allowed transmission rate based on a predetermined algorithm, and selecting, a smaller one among the first allowed transmission rate and the second allowed transmission rate, and writing it into a packet returned to the transmitting terminal.

In the preferred construction, at the step of determining the first allowed transmission rate, when the interval of packet reception is smaller than the threshold, the transmitting terminal having send the packet is judged to be in pause of transmission.

In the preferred construction, at the step of determining the first allowed transmission rate, when the status in which the interval of packet reception is smaller than the threshold lasts for a time equivalent to the protection time, the transmitting terminal having sent the packet is judged to be in pause of transmission.

In another preferred construction, the step of determining the first allowed transmission rate further comprises the steps of taking a preset value for the first allowed transmission rate when the transmitting terminal is judged to be in pause of transmission, and taking, otherwise, for the first allowed transmission rate a maximum value allowed for a transmission in the network.

In another preferred construction, the step of determining the first allowed transmission rate further comprises the steps of taking for the first allowed transmission rate a preset value which is approximately an initial transmission rate of the transmitting terminal when the transmitting terminal is judged to be in pause of transmission, and taking, otherwise, for the first allowed transmission rate a maximum value allowed for a transmission in the network.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
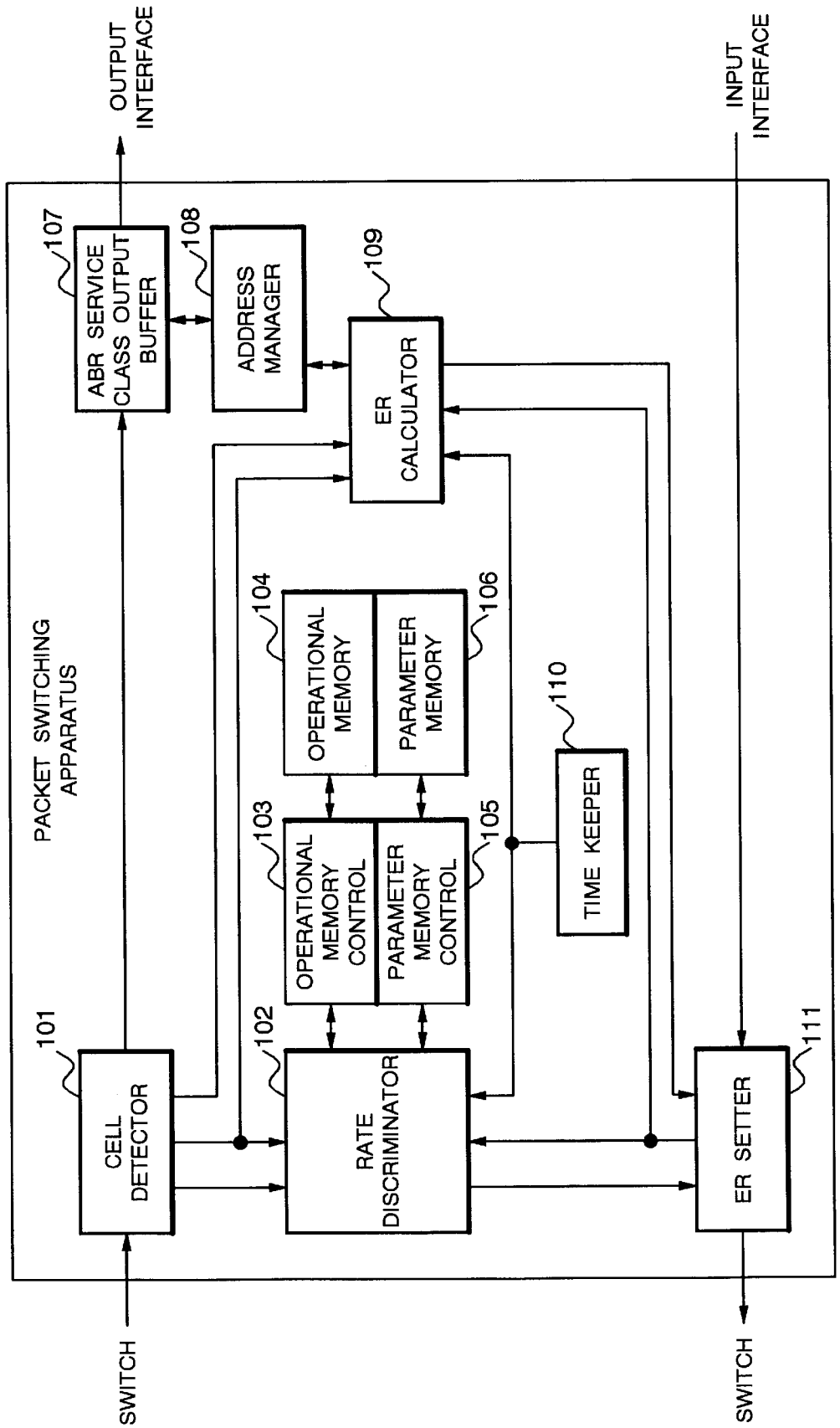
FIG. 1 is a schematic block diagram of an embodiment of the packet switching apparatus according to the present invention.

FIG. 1 is a schematic block diagram showing the configuration of an embodiment of the packet switching apparatus according to the present invention. As shown, the packet switching apparatus according to this embodiment comprises a cell detector 101, a rate discriminator 102, an operational memory controller 103 and operational memory 104, a parameter memory controller 105 and parameter memory 106, an ABR service class output buffer 107, an address manager 108, an ER calculator 109, a timer keeper 110, and an ER setter 111. It should be noted that only the components characteristic of the present invention are illustrated with other common components omitted. An ATM switch works in units of VP (virtual path) or in units of VC (virtual channel) as the case may be. The following description will refer to an ATM switch in which the packet switching apparatus according to the present invention is used works in units of VC (virtual channel). Of course, the embodiment of the present invention is applicable for an ATM switch which works in units of VP.

In this embodiment, the cell detector 101 receives a cell from a switch (not shown), sends a cell reception flag and VC value to the rate discriminator 102, and the cell reception flag, VC value and a cell class information to the ER calculator 109. The cell class information is an information indicating which the cell received from the switch is, a data cell or an RM cell.

Based on a current time received from the time keeper 110 and the VC value and cell reception flag received from the cell detector 101, the rate discriminator 102 controls an arrival time of a cell for each VC. The operational memory controller 103 and operational memory 104 are used to calculate, based on a time at which a cell has been received, and keep in a same VC a time at which a next cell is to be received. Further, based on a time of cell interval thus calculated, a threshold rate (TCR) previously stored in the parameter memory 106 and a time of protection $T_{TCR}$, an ER is determined and sent to the ER setter 111. The values of TCR and protection time $_{TTCR}$ can arbitrarily be set. The function of the rate discriminator 102 will be apparent from the detail description given later.

Using a predetermined algorithm of ER calculation, the ER calculator 109 calculates an ER from the cell reception flag, VC value and cell class information received from the cell detector 101, and a queue length information received from the ABR service class output buffer 107 via the address manager 108. The ER calculation algorithm may be a conventional one.

The time keeper 110 always counts a time and sends a current time to the rate discriminator 102 and ER calculator 109.

Upon reception of a BRM cell from an input circuit interface (not shown), the ER setter 111 determines an ER value which is to be informed to a transmitting terminal on a VC to which the BRM belongs, writes it into the ER area of the BRM cell, and sends it to a switch (not shown). The ER value of the BRM cell is determined by selecting either of the ER values received from the rate discriminator 102 and ER calculator 109, whichever is smaller.

The packet switching apparatus according to this embodiment functions as will be discussed in detail with reference to FIG. 1:

Upon arrival, through the switch, of a cell of a predetermined VC delivered from a predetermined transmitting terminal connected to the network, the cell detector 101 will send a flag indicating the reception of the cell and the value of the VC to the rate discriminator 102. Then the rate discriminator 102 will read a TCR and protection time $T_{TCR}$ from the parameter memory 106 by means of the parameter memory controller 105 to judge whether the transmitting terminal having sent the VC is substantially in pause of transmission. If the actual transmission rate of the received cell is lower than the TCR and the time for which the actual transmission rate lower than the TCR lasts reaches the protection time $T_{TCR}$ the transmitting terminal is judged to be in pause of transmission.

The actual transmission rate of the transmitting terminal is kept low for a certain length of time in some cases (the transmitting terminal is substantially in pause of transmission), while it is caused by a bursting traffic to temporarily be lower than the TCR in other cases. If it is assumed that the ACR is also initialized in case the rate is momentarily low, the initialization will be effected very frequently and the throughput become extremely low. To avoid this, a protection time $T_{TCR}$ is set for no ACR initialization to be done when a time period for which the actual transmission rate is lower than the TCR is shorter than the protection time $T_{TCR}$. Since a TCR is set for initializing the ACR (a set value of TCR will be referred to as "TCR" herebelow), the TCR should desirably be same as the ICR of the transmitting terminal.

When having judged the transmitting terminal not to be in pause of transmission, the rate discriminator 102 will set the ER value to be informed to the ER setter 111 to "PCR" of the transmitting terminal in consideration. This is intended for selecting, in selecting either an ER value determined by the rate discriminator 102 or a one calculated by the ER calculator 109, whichever is smaller, as an ER value of a BRM to be sent to the transmitting terminal in consideration, the ER value calculated by the ER calculator 109. On the other hand, when the transmitting terminal is judged to be in pause of transmission, the ER value to be sent to the ER setter 111 is set to "TCR". Upon request from the ER setter 111, the ER calculator 109 will inform the ER setter 111 of a currently latest ER value.

Using the conventional algorithm of ER calculation, the ER calculator 109 calculates an ER from a VC value and cell class information received from the cell detector 101, a queue length information received from the address manager 108, and a time information received from the time keeper 110. Upon request from the ER setter 111, the ER calculator 109 will inform the ER setter 111 of a currently latest ER value.

The ER setter 111 detects a BRM cell from among the cells received from an input circuit interface (not shown) and informs the rate discriminator 102 and ER calculator 109 of a VC of the detected BRM cell to request them for ER values for the VC. Upon reception of the ER values sent from the rate discriminator 102 and ER calculator 109, the ER setter 111 will compare the ER values with each other and selects a smaller one of them for writing into the BRM cell which will be sent to the switch (not shown).

With the above operations, the ER value for sending to the transmitting terminal is normally a same one as in the prior art that indicates an ATM switch-allowable rate. However, when the transmitting terminal is in pause of transmission and the actual transmission rate is decreased, the ER value will be changed over to a one intended for initialization of the ACR. If a congestion has caused the actual transmission rate to temporarily be lower, an ER value indicative of an ATM switch-allowable rate and smaller than the ER value intended for the ACR initialization, will be chosen.

Figure 2:
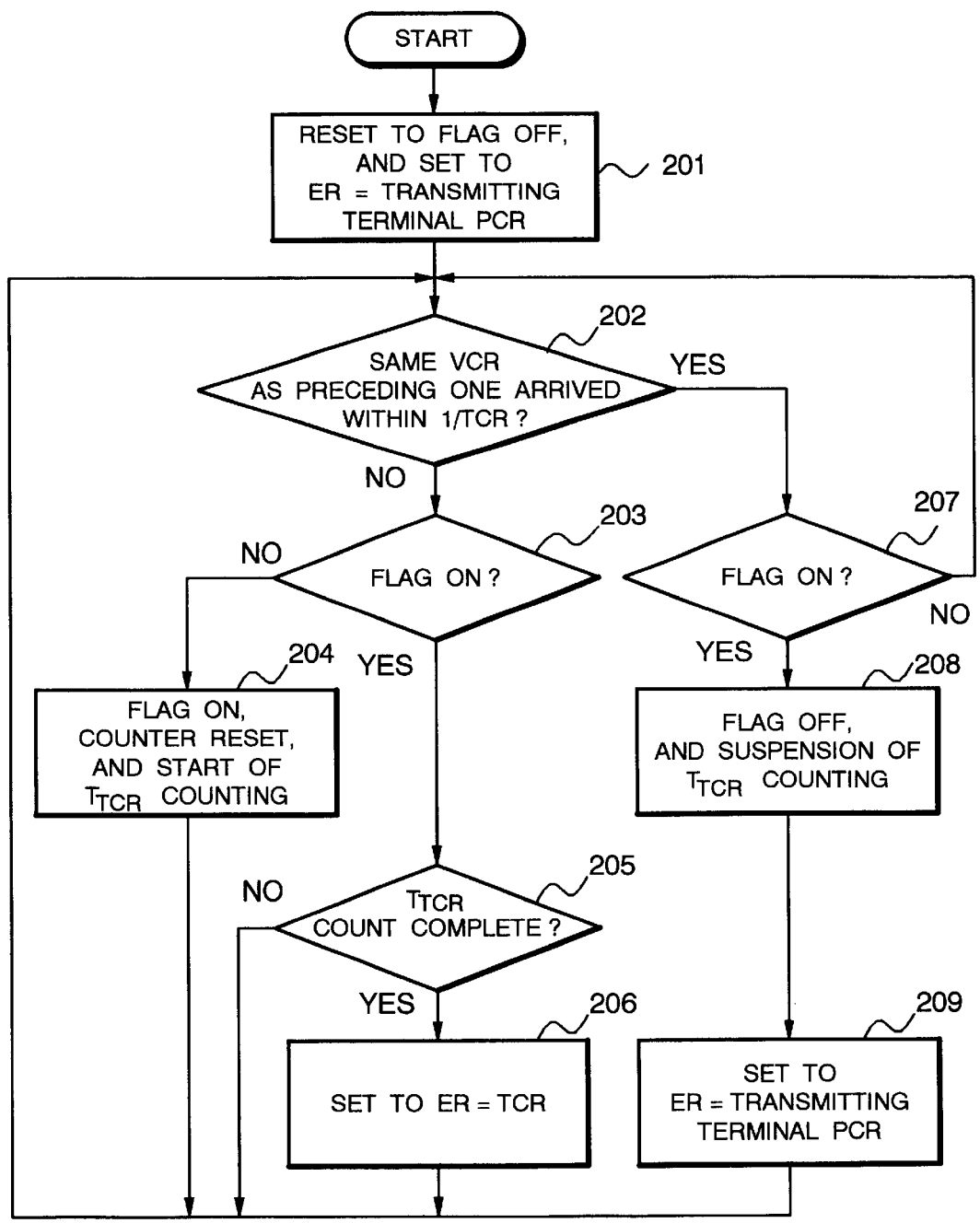
FIG. 2 is a flow chart of operations of a rate discriminator in the embodiment in FIG. 1.

The rate discriminator 102 in this embodiment functions as will be discussed in detail with reference to FIG. 2 being a flow chart of its operations.

As in the flow chart of FIG. 2, the rate discriminator 102 first resets a flag indicating that the rate of reception from the transmitting terminal is lower than TCR (the flag will be referred to as "status flag" hereinafter), and sets to PCR of the transmitting terminal an ER of which the ER setter 111 is to be informed (at step 201). Then, based on the cell reception flag and VC value received from the cell detector 101, the rate discriminator 102 will check whether after a cell of a predetermined VC value is received, a next cell of the same VC value is received within a time of "1/TCR" (at step 202). If such a cell is received within the time "1/TCR", it is meant that the actual transmission rate of the transmitting terminal on the VC is not less than the TCR. Therefore, the transmitting terminal is judged not to be in pause of transmission. If the status flag is off, that is, if the transmission rate has already been higher than TCR before reception of the next cell, the operation returns to step 202 with no further operation (at step 207). On the other hand, if the status flag is on, it is turned off, the counting of the protection time $T_{TCR}$ is interrupted (at steps 207 and 208) and an ER value to be sent to the ER setter 111 is set to the PCR of the transmitting terminal on the VC in consideration (at step 209).

If no next cell is received within a time "1/TCR" at step 202, the rate of reception from the transmitting terminal on the VC can be judged to be lower than "TCR". In this case, if the status flag is off and the protection time $T_{TCR}$ is not yet counted, the status flag is turned on, the counter is reset, then the counting of the protection time $T_{TCR}$ is started (at steps 203 and 204), and it is judged again at step 202 whether the rate of cell reception is still lower than "TCR". On the other hand, if the rate of cell reception has already been less than "TCR" before the cell reception, namely, if the status flag is on (at step 203), it is judged whether the counting of the protection time $T_{TCR}$ is complete (at step 205). If the counting of the protection time $T_{TCR}$ is not yet complete, it is judged again at step 202 whether the rate of cell reception is lower than "TCR". If the counting of the protection time $T_{TCR}$ is complete, the rate of reception from the transmitting terminal on the VC becomes lower than "TCR" and the status has already lasted until the protection time $T_{TCR}$, so that an ER value for sending to the ER setter 111 is set to "TCR" (at steps 205 and 206).

Figure 3:
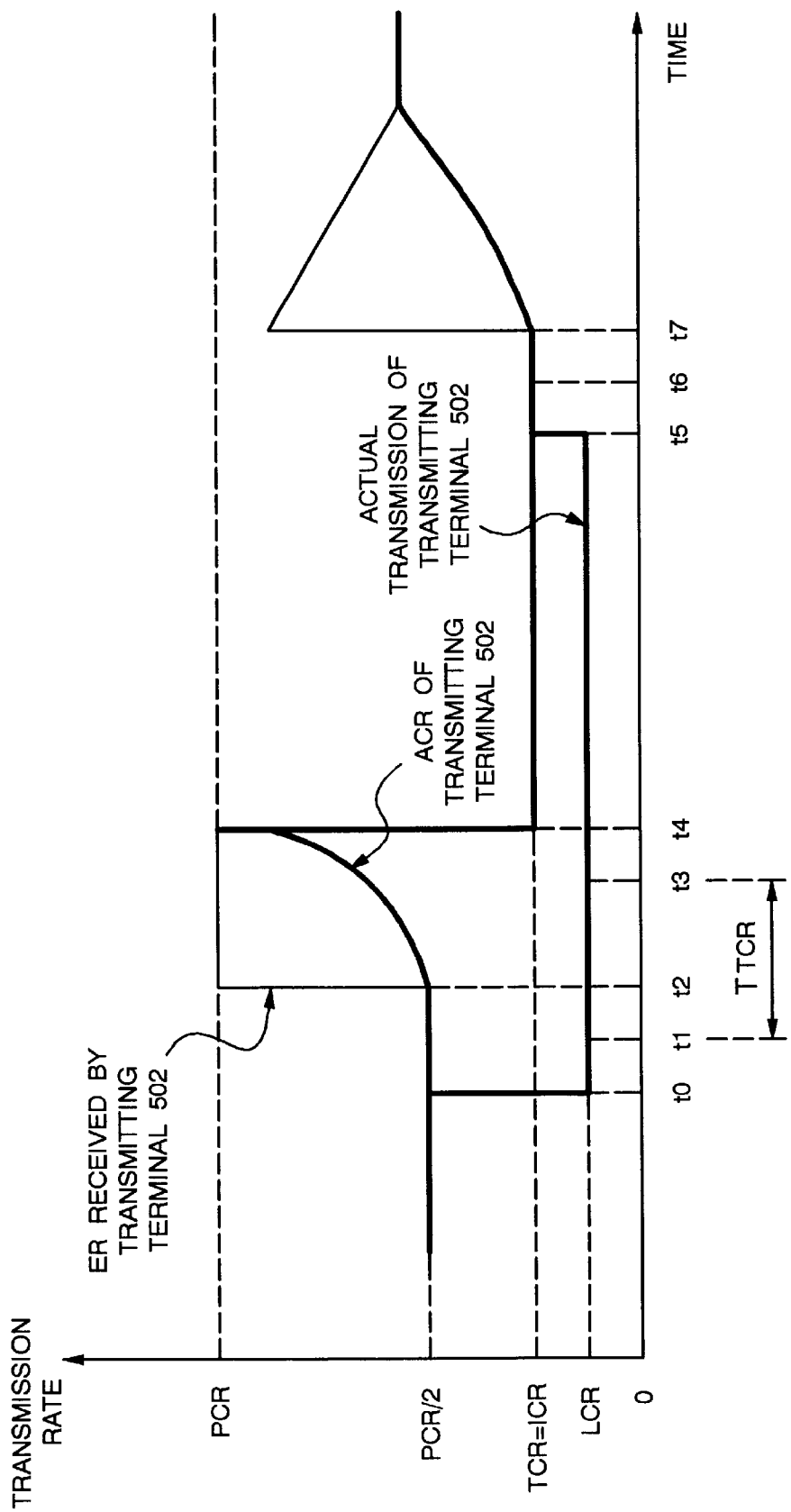
FIG. 3 is a time chart of rate control operations in the embodiment of the present invention in FIG. 1.
Figure 4:
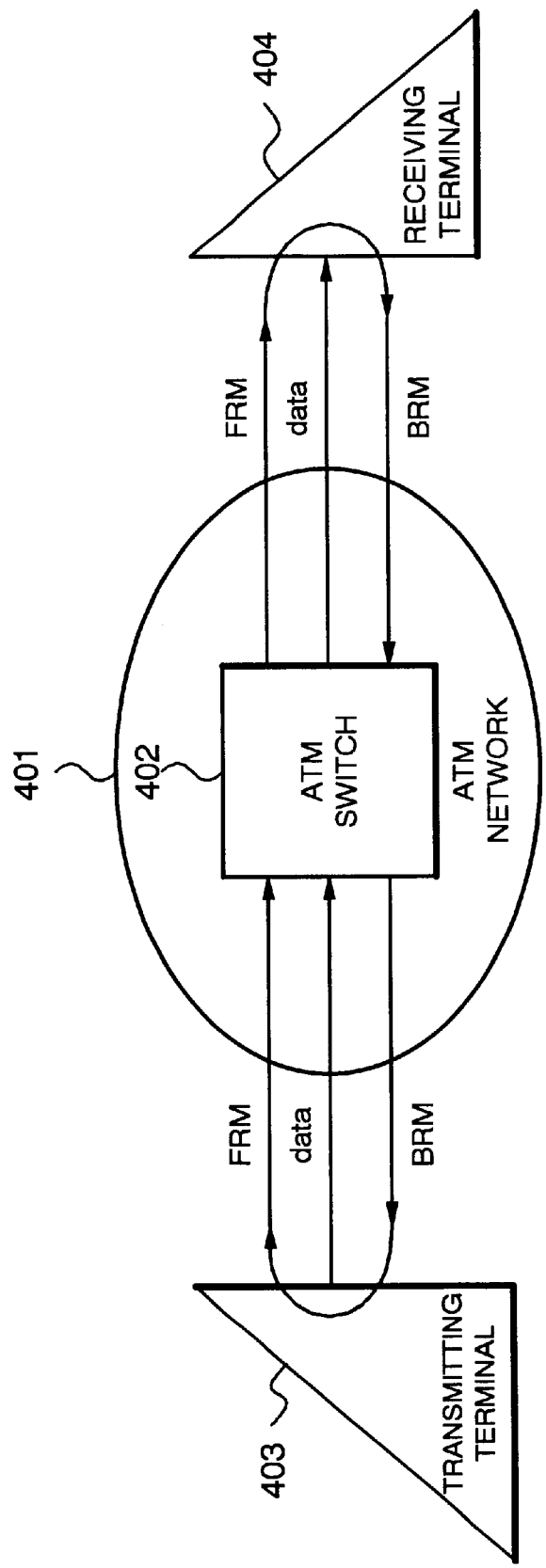
FIG. 4 is a schematic block diagram of an ATM network for an ABR service, showing the configuration of the network.
Figure 5:
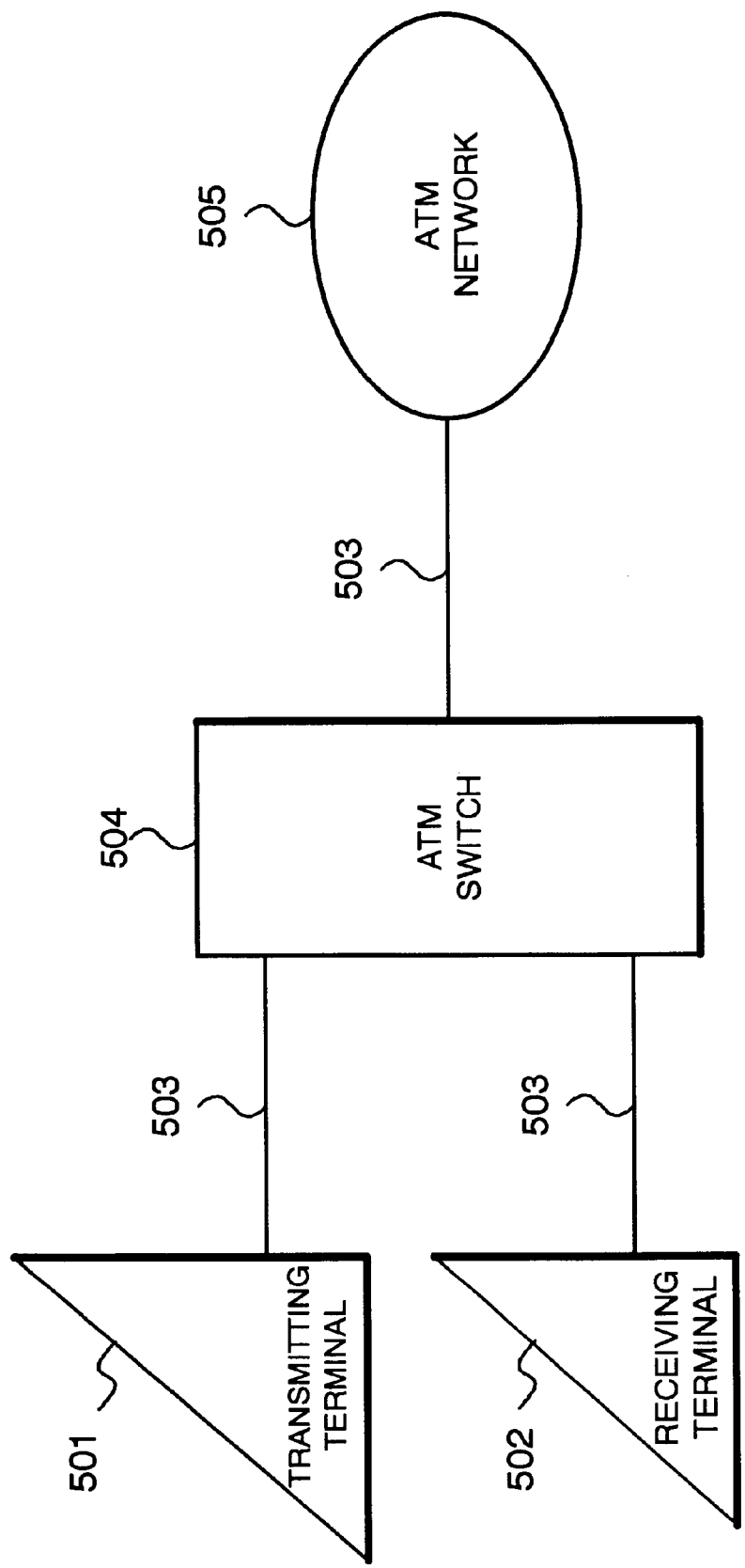
FIG. 5 is a schematic block diagram of an ATM switch in the ATM network, showing the role of the ATM switch.
Figure 6:
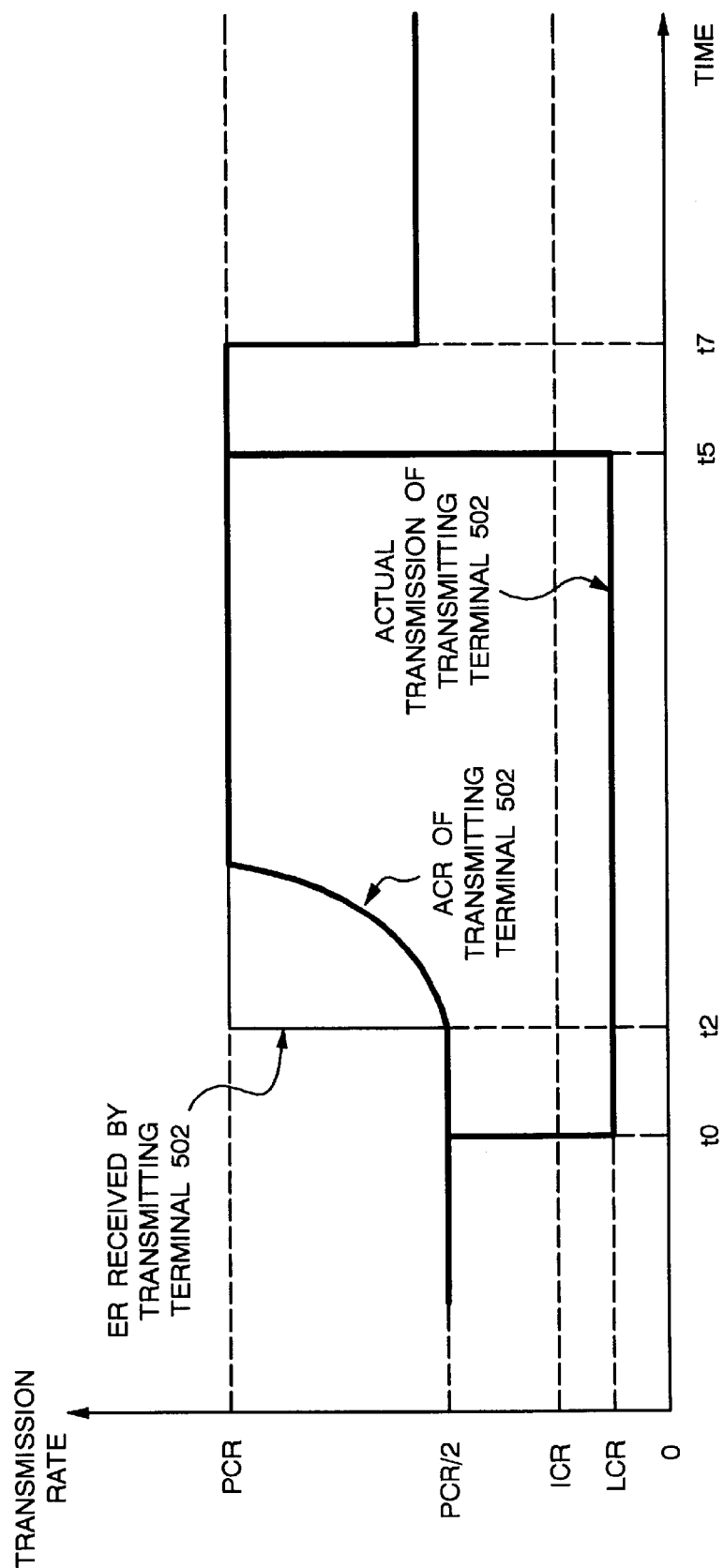
FIG. 6 is a time chart of the conventional rate control operations.

The ACR control in this embodiment will further be described with reference to FIG. 3 being a time chart of the operations of the transmitting terminal 502 in the network in FIG. 5 using the ATM switch in which the packet switching apparatus according to the present invention is incorporated. FIG. 3 shows values of ER, ACR and actual transmission rate received by the transmitting terminal 502. In the network illustrated in FIG. 5, the transmitting terminals 502 equal in PCR to each other are connected to the ATM switch 504 to the links 503, respectively, each having a linkage capacity which is same as the PCR of the transmitting terminals 501 and 502, they are multiplexed by the ATM switch 504, and connected to the ATM network 505 by means of the single link 503. Of the transmitting terminals, one 501 will always send data at a full ACR as the actual transmission rate while the other 502 will send data initially at the full ACR, then at a rate extremely low (LCR) but at which the ACR is not initialized by the transmitting terminal itself, and at the full ACR again in a predetermined time after that.

As seen from FIG. 3, when the transmitting terminals 501 and 502 are continuously transmitting data, the ER value is "PCR/2" for no congestion of the ATM switch 504. Therefore, the ACR of the transmitting terminals 501 and 502 is also "PCR/2". Namely, the transmitting terminals 501 and 502 transmit data at the actual rate of "PCR/2".

In this condition, the actual transmission rate of the transmitting terminal 502 is reduced to "LCR" at a time t0. Since the distance between the transmitting terminal 502 and ATM switch 504 causes a propagation delay, the ATM switch 504 will receive the actual transmission rate "LCR" of the transmitting terminal 502 at the time t1 at which the ATM switch 504 will detect that the actual transmission rate is less than "TCR", and start counting the protection time $T_{TCR}$.

The ER value of which the transmitting terminal 502 is informed is a one calculated by the conventional ER calculator. Therefore, the load to the ATM switch 504 is halved because of the reduced actual transmission rate of the transmission terminal 502, so that the ER value increases up to "PCR". It is at a time t2 delayed a predetermined time caused by the propagation delay that the ER value arrives at the transmitting terminals 501 and 502.

At a time t3 delayed by a protection time $T_{TCR}$ from the detection that the actual transmission rate has fallen to "LCR", the ATM switch 504 will judge that the transmitting terminal 502 is substantially in pause of transmission and send an ER set to the value "TCR" to the transmitting terminal 502. The ER value sent to the transmitting terminal 501 remains as "PCR" with no change. When an ER of the value "TCR" is received at a time t4 delayed a predetermined time from the time t3 because of the propagation delay, the value of ACR having increased toward "PCR" has to be decreased to "TCR" correspondingly to the received ER value. The ER value sent from the ATM switch 504 is not changed from "PCR" so long as the transmitting terminal 502 keeps transmitting data at a rate lower than "TCR".

Next, if the factor having caused the actual transmission rate of the transmitting terminal 502 to LCR is removed at a time t5, the actual transmission rate of the transmitting terminal 502 will be increased up to "TCR". At a time t6 delayed a predetermined time from the time t5, the ATM switch 504 will detect the increased actual transmission rate, change the ER value from a one set to "TCR" to a one calculated by the conventional method of ER calculation, and send the ER value to the transmitting terminal 502. At a time t7 delayed a predetermined time from the time t6, the transmitting terminal 502 will receive the new ER value, and increase the actual transmission rate little by little from "TCR" as the ACR value is increased. With the above operations, the actual transmission rate received by the ATM switch 504 from the transmitting terminal 502 can be prevented from abruptly increasing, so that the ATM switch 504 will not easily be congested.

As having been described in the foregoing, even if lasting, for a predetermined length of time, of a low actual transmission rate of a predetermined one of the transmitting terminals connected in a network has led to ACR initialization and thereafter the amount of transmitted data from the transmitting terminal suddenly increases, the present invention permits to prevent the actual transmission rate of the transmitting terminal from abruptly changing to a larger value. Thus, the present invention permits to effectively prevent a cell from being discarded when the network is suddenly applied with a large load.

Also, since the ACR of the transmitting terminal is initialized under control of the network, the present invention can assure a higher network safety than the prior art in which the increase or decrease of the actual data transmission rate is affected only by the operation of the transmitting terminal.

Since it is judged whether the transmitting terminal is in pause of transmission for each virtual path or virtual channel, ACR of other virtual paths or channels is not affected as by the conventional method of ER calculation.

Further, since a time of protection is set as a factor to judge whether a transmitting terminal is in pause of transmission, a temporary reduction of the actual transmission rate due to a bursting traffic cannot be judged to be in pause of transmission. Therefore, even frequent ACR initialization will not lead to any deduction of the throughput.

Furthermore, since ACR initialization is done by sending an ER value set nearly to ICR to a transmitting terminal judged to be in pause of transmission, any high ACR of the transmitting terminal will not be maintained. Therefore, even if the transmitting terminal has a suddenly increased amount of data to send, the actual transmission rate may be raised little by little.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A packet switching apparatus adapted to determine and control an allowed transmission rate for a transmitting terminal connected in a packet switching network in which a band is controlled by a feedback control, comprising:

means for monitoring the interval of packet reception for each connection, and judging, based on the interval of packet reception, whether the transmitting terminal having sent the packet is in pause of transmission and determining a first allowed transmission rate for the transmitting terminal correspondingly to a result of the judgment;

means for calculating a second allowed transmission rate based on a predetermined algorithm; and means for selecting a smaller one among the first allowed transmission rate determined by said rate discriminating means and the second allowed transmission rate calculated by said rate calculating means, and writing it into a packet returned to the transmitting terminal, wherein the interval of packet reception is made with respect to intervals between all consecutively received cells, including resource management cells and non-resource management cells received in any sequential order, that are output from the transmitting terminal.

2. The apparatus as set forth in claim 1, further comprising:

means for storing a threshold arbitrarily set for the interval of packet reception;

said rate discriminating means judging, when the interval of packet reception is smaller than the threshold, the transmitting terminal having sent the packet to be in pause of transmission.

3. The apparatus as set forth in claim 2, further comprising:

means for storing the arbitrarily set threshold for the interval of packet reception and an arbitrarily set protection time;

said rate discriminating means judging, when the status in which the interval of packet reception is smaller than the threshold lasts for a time equivalent to the protection time, the transmitting terminal having sent the packet to be in pause of transmission.

4. The apparatus as set forth in claim 1, wherein when said rate discriminating means judges said transmitting terminal to be in pause of transmission, a preset value is taken for the first allowed transmission rate, when said transmitting terminal is not in pause of transmission, a maximum value allowed for a transmission in the network is taken for the first allowed transmission rate.

5. The apparatus as set forth in claim 1, wherein when said rate discriminating means judges the transmitting terminal to be in pause of transmission, a preset value which is approximately an initial transmission rate of the transmitting terminal is taken for the first allowed transmission rate, when said transmitting terminal is not in pause of transmission, a maximum value allowed for a transmission in the network is taken for the first allowed transmission rate.

6. A packet switching apparatus adapted to determine and control an allowed transmission rate for a transmitting terminal connected in an ATM network being a packet switching network in which a band is controlled by a feedback control, and in which an ABR service is done in which a band control by a resource management cell is effected, comprising:

means for monitoring the interval of cell reception for each virtual path or channel of a reception cell, and judging, based on the interval of cell reception, whether the transmitting terminal having sent the cell is in pause of transmission and determining a first ER value for the transmitting terminal correspondingly to a result of the judgment, the interval of cell reception being monitored with respect to intervals between reception times of cells received from the transmitting terminal over said each virtual path or channel, irrespective as to whether or not the received cell is a resource management cell or a non-resource management cell;

means for calculating a second ER value based on a predetermined algorithm; and means for selecting a smaller one among the first ER value determined by said rate discriminating means and the second ER value calculated by said rate calculating means, and writing it into a backward resource management cell returned to the transmitting terminal.

7. The apparatus as set forth in claim 6, further comprising:

means for storing a threshold arbitrarily set for the interval of cell reception;

said rate discriminating means judging, when the interval of cell reception is smaller than the threshold, the transmitting terminal having sent the cell to be in pause of transmission.

8. The apparatus as set forth in claim 7, further comprising:

means for storing the arbitrarily set threshold for the interval of cell reception and an arbitrarily set protection time;

said rate discriminating means judging, when the status in which the interval of cell reception is smaller than the threshold lasts for a time equivalent to the protection time, the transmitting terminal having sent the cell to be in pause of transmission.

9. The apparatus as set forth in claim 6, wherein when said rate discriminating means judges the transmitting terminal to be in pause of transmission, a preset value is taken for the first ER value, when said transmitting terminal is not in pause of transmission, a peak cell rate allowed for a transmission in the network is taken for the first ER value.

10. The apparatus as set forth in claim 6, wherein when said rate discriminating means judges the transmitting terminal to be in pause of transmission, a preset value which is approximately an initial cell rate of the transmitting terminal is taken for the first ER value, when said transmitting terminal is not in pause of transmission, a peak cell rate allowed for a transmission in the network is taken for the first ER value.

11. A method of determining and controlling an allowed transmission rate for a transmitting terminal connected to a packet switching network in which a band is controlled by a feedback control, comprising the steps of:

monitoring the interval of packet reception for each connection, the interval of cell reception being monitored with respect to intervals between reception times of cells received from the transmitting terminal over said each connection, irrespective as to whether or not the received cell is a resource management cell or a non-resource management cell;

judging, based on the interval of packet reception, whether the transmitting terminal having sent the packet is in pause of transmission and determining a first allowed transmission rate for the transmitting terminal correspondingly to a result of the judgment;

calculating a second allowed transmission rate based on a predetermined algorithm; and selecting a smaller one among the first allowed transmission rate and the second allowed transmission rate, and writing it into a packet returned to the transmitting terminal.

12. The method as set forth in claim 11, wherein at said step of determining the first allowed transmission rate, when the interval of packet reception is smaller than the threshold, the transmitting terminal having send the packet is judged to be in pause of transmission.

13. The method as set forth in claim 11, wherein at said step of determining the first allowed transmission rate, when the status in which the interval of packet reception is smaller than the threshold lasts for a time equivalent to the protection time, the transmitting terminal having sent the packet is judged to be in pause of transmission.

14. The method as set forth in claim 11, wherein said step of determining the first allowed transmission rate further comprises the steps of:

taking a preset value for the first allowed transmission rate when the transmitting terminal is judged to be in pause of transmission; and taking, otherwise, for the first allowed transmission rate a maximum value allowed for a transmission in the network.

15. The method as set forth in claim 11, wherein said step of determining the first allowed transmission rate further comprises the steps of:

taking for the first allowed transmission rate a preset value which is approximately an initial transmission rate of the transmitting terminal when the transmitting terminal is judged to be in pause of transmission; and taking, otherwise, for the first allowed transmission rate a maximum value allowed for a transmission in the network.

* * * * *